United States Patent [19]

Fieldhouse et al.

[11] 4,128,710
[45] Dec. 5, 1978

[54] PROCESS FOR THE PRODUCTION OF PHOSPHAZENE POLYMERS

[75] Inventors: John W. Fieldhouse, Mogadore; Daniel F. Graves, Akron; William M. Cole, Norton; Mark L. Stayer, Suffield; Steven L. Fenske, Uniontown, all of Ohio

[73] Assignee: The Firestone Tire & Rubber Company, Akron, Ohio

[21] Appl. No.: 845,009

[22] Filed: Oct. 25, 1977

[51] Int. Cl.$^2$ .................... C08G 73/00; C08J 3/00
[52] U.S. Cl. .................... 528/168; 528/399; 528/400; 528/490
[58] Field of Search .................... 260/2 P, 47 P

[56] References Cited

U.S. PATENT DOCUMENTS

| | | | |
|---|---|---|---|
| 3,271,330 | 9/1966 | Evans | 260/2 P |
| 4,073,824 | 2/1978 | Dieck et al. | 260/2 P |

*Primary Examiner*—Wilbert J. Briggs, Sr.

[57] ABSTRACT

The production of phosphazene polymers represented by the general formula

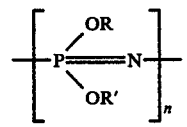

wherein R and R' are organic radicals hereinafter defined, and wherein $n$ is an integer from 20 to upwards of 50,000 wherein one or more kinds of OR or OR' groups is attached to the phosphorus atoms in a substantially linear chain of alternating P and N atoms, the groups when more than one group is present being randomly distributed along the PN backbone, as described in copending United States Patent Application Ser. No. 824,004 filed Aug. 12, 1977, is enhanced by an improved procedure for the separation of the sodium chloride by-product from the derivatized phosphazene polymer. By treating the reaction mixture with carbon dioxide, in the presence of water and preferably with an additional alkali metal salt, agglomeration of the sodium chloride is accomplished, and a clean separation of the NaCl from the polyphosphazene ester is more readily achieved.

10 Claims, No Drawings

PROCESS FOR THE PRODUCTION OF PHOSPHAZENE POLYMERS

This invention relates to an improved process for the production of polyphosphazenes in which the substituents on the phosphorus atoms are those described in any of the following United States Patents:

| Allcock | 3,370,020 | issued February | 20, 1968 |
| Rose | 3,515,688 | issued June | 2, 1970 |
| Reynard et al | 3,700,629 | issued October | 24, 1972 |
| Rose et al | 3,702,833 | issued November | 14, 1972 |
| Reynard et al | 3,856,712 | issued December | 24, 1974 |
| Rose et al | 3,856,713 | issued December | 24, 1974 |
| Reynard et al | 3,853,794 | issued December | 10, 1974 |
| Reynard et al | 3,883,451 | issued May | 13, 1975 |
| Kyker et al | 3,970,533 | issued July | 20, 1976 | and others of a similar nature in which products having the general formula

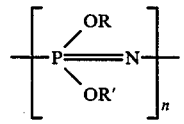

wherein R and R' are each selected from the group consisting of alkyl, alkylaryl, aryl any of which may be either substituted or unsubstituted as shown in the above noted patents, and need not be the same and n is an integer between about 20 and about 50,000 or more, and in which some of the R or R' groups may contain some unsaturation to facilitate curing the products, e.g. as described in Kyker et al U.S. Pat. No. 3,970,533.

The above noted patents describe processes in which linear polydihalophosphazenes are derivatized by reaction with an alkali or alkaline earth compound represented by the general formula $M(OR)_x$ in which M represents lithium, sodium, potassium, magnesium or calcium; x is equal to the valence of M; and R represents an alkyl radical or an aryl radical either of which may be substituted, e.g. as described in U.S. Pat. No. 3,370,020 issued Feb. 20, 1968 to Allcock et al, the esterification step (see column 3 of the patent) has usually been conducted by bringing a solution of the polydihalophosphazene dissolved in an aromatic solvent into contact with a solution of the alkoxide or aryloxide dissolved in an entirely different solvent.

Solvents for the polydihalophosphazene reactant have usually been benzene, toluene, xylene or other similar aromatic hydrocarbons which are commercially readily available and are relatively inexpensive (see Rose, U.S. Pat. No. 3,515,688 issued June 2, 1970 and the other above noted patents, for example).

A variety of solvents have been utilized for the alkoxide or aryloxide including:methanol disclosed in Example 2 of the Allcock et al patent; tetrahydrofuran disclosed in the Rose patent, and ethers disclosed in Reynard et al, U.S. Pat. No. 3,883,541, noted above, but in every such reported synthesis in which the two reactants were brought together as solutions, two distinct and different solvents were utilized and the resulting derivatized product precipitates from the solutions being reacted, usually with entrapment of the metal halide by-product formed in the reaction. This results in a heterogeneous system in which the reacting solutes are in contact with each other for only limited times, with consequent adverse effect on yields of the desired esters. In addition, it has been found that complete substitution of P-Halogen bonds is very difficult to achieve in a heterogeneous system, and is relatively simple to achieve in a homogeneous system.

In a copending United States Patent Application Ser. No. 824,004 filed Aug. 12, 1977, the disclosure of which is incorporated herein by this reference, an improvement in such processes is achieved by the provision of a single solvent for both the polydihalophosphazene reactant and the alkoxide and/or aryloxide reactants and which is also a solvent for the desired ester product and which is a non-solvent for the inorganic halide by-product, i.e., the alkali metal halide or alkaline earth halide formed as the other reaction product.

The present invention is particularly applicable to the improved derivatization process described in the copending United States Patent Application noted above.

More particularly, it is applicable to such derivatization processes in which the polydihalophosphazene starting material is polydichlorophosphazene and the alkoxy and/or aryloxy starting materials are in the form of their sodium salts, and as a consequence the metal halide by-product of their reaction with each other is NaCl.

The principal object of this invention is to simplify the separation of the inorganic halide (NaCl) from the solution of the polyphosphazene derivative formed during said reaction between one or more sodium aryloxides or alkoxides and polydichlorophosphazene in solution.

Still a further object of the invention is to provide a process for producing alkoxy and/or aryloxy phosphazene polymers or copolymers in which the quality of the product is improved by rapid neutralization of the highly basic excess aryloxide and/or alkoxide usually present when the reaction is effected.

A further object is to accomplish this neutralization by the addition of carbon dioxide, and then an aqueous hydrolysis of the intermediate sodium arylcarbonate and/or sodium alkylcarbonate, with the formation of (1) sodium bicarbonate which can be easily separated from the phosphazene polymer by purely physical means, and (2) aliphatic or aromatic alcohols which can be recovered by solvent stripping.

These and other objects of the invention will be pointed out or will become clear from the description which follows of preferred embodiments of the invention.

A solution of linear polydichlorophosphazene $(NPCl_2)_n$ (n > 7) in THF [5–10% $(NPCl_2)_n$ by weight] was prepared after the lower molecular weight cyclic oligomers had been removed from the linear polydichlorophosphazene by known purification procedures such as solvent extraction or sublimation, as described in the open literature. A small amount of an amine, e.g. diphenylamine was added to inhibit the formation of poly-tetrahydrofuran in the solution of linear polydihalophosphazene.

Sixty grams (1.03 mol) of polydichlorophosphazene in 590 g (a 9.2% solution) of tetrahydrofuran (distilled from sodium) was pressurized into a 3 liter glass reactor under nitrogen into a THF solution of 584 g of 2.00 mm sodium fluoroalkoxides per gram of solution (1.17 m sodium fluroralkoxide) which had previously been charged. The contents of the reactor were stirred for 3 hours at 60°–65° C. and then cooled to 25°–30° C. Excess sodium fluoroalkoxides present in the reaction mixture were then neutralized with carbon dioxide followed by addition of 45 g of a 10 weight percent solution of sodium bromide in water, resulting in agglomeration of the finely divided sodium chloride. The sodium chloride was then filtered or removed by centrifugation. Other salts may be used to aid in the agglomeration of NaCl in combination with the $CO_2$ treatment, just described. In general it appears that alkali metal salts which exhibit a density greater than the density of NaCl in their solid crystalline state are suitable substitutes for the presently preferred NaBr, described above. The volatile tetrahydrofuran was then removed by a solvent evaporator, for reuse. Traces of fluoroalcohol were then removed at a higher temperature (100°–110° C.) for 20 hours at 5 mm Hg giving 130 g of a dry elastomeric poly(fluoroalkoxyphosphazene), with the following typical analysis: Dilute Solution Viscosity—2.61; % Gel 0.0; Weight Percent Sodium 0.11; Weight Percent Chloride 0.06.

In Table I which follows, results of the use of water alone, and combinations of water, $CO_2$ and various alkali metal salts for enhancing the separation of NaCl from the reaction products, are illustrated.

TABLE I

| | Treatment | Agglomeration | % Gel | % Na* | % Cl* |
|---|---|---|---|---|---|
| 1. | $H_2O$ (3) | Fair/Poor | 0.0 | 0.7 | 1.08 |
| 2. | $CO_2/H_2O$ (5) | Poor/Excellent | 2.0 | 0.48 | 0.59 |
| 3. | $CO_2/KHCO_3$ (1) | Fair | 3.1 | 0.24 | 0.31 |
| 4. | $H_2O/KHCO_3$ (1) | Excellent | 0.0 | 0.32 | 0.68 |
| 5. | $H_2O/KHCO_3/K_2CO_3$ (1) | Excellent | 0.0 | 0.40 | 0.10 |
| 6. | $CO_2/H_2O/KHCO_3$ (2) | Good/Excellent | 0.0 | 0.27 | 0.47 |
| 7. | $CO_2/H_2O/K_2CO_3$ (2) | Excellent | 0.0 | 0.19 | 0.11 |
| 8. | $CO_2/H_2O/LiBr$ (1) | Excellent | 0.0 | 0.03 | 0.04 |
| 9. | $CO_2/H_2O/KCl$ (3) | Fair/Excellent | 0.0 | 0.35 | 0.36 |
| 10. | $CO_2/H_2O/KBr$ (2) | Good/Excellent | 0.0 | 0.45 | 0.67 |
| 11. | $CO_2/H_2O/NaBr$ (33) | Excellent | 0.0 | 0.16 | 0.16 |
| 12. | $CO_2/H_2O/NaCl$ (1) | Very Poor | 2.4 | 0.33 | 0.44 |

*present in recovered polyphosphazene

The results reported are an average of several individual runs. The number of runs being averaged is indicated by the figure in parenthesis.

The amount of $CO_2$ added to the solution should be sufficient to neutralize any excess sodium aryloxide and/or sodium alkoxide present and to reduce the pH of the resulting solution to about 7.0–7.5.

The amount of 10% alkali metal salt solution added to the neutralized solution, to enhance agglomeration of the NaCl is between about 2.5 and 6.0 parts by weight of the solution, about 4.0 parts being optimum.

Having now described the preferred embodiments of the invention it is not intended that it be limited except as may be required by the claims which follow.

We claim:

1. In a process for producing alkoxy and/or aryloxy polyphosphazene esters represented by the general formula

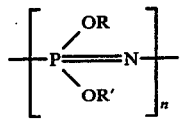

wherein each OR or OR' represents at least one alkoxy or aryloxy group including groups with either saturated or unsaturated substituents and not all of the OR and OR' groups are required to be the same, and n is an integer of between about 10 and about 50,000 or more;
   wherein a solution of a linear dichlorophosphazene represented by the formula $(NPCl_2)_m$ and m is an integer greater than about 7 is reacted with a solution of at least one alkoxide or aryloxide represented by the formula NaOR or NaOR';
   and a solution of the desired ester is produced along with NaCl as a by-product of the reaction, the improvements which comprise;
   treating the resulting solution of polyphosphazene ester and sodium chloride with $CO_2$ and water in an amount sufficient to neutralize any alkoxide or aryloxide present in said resulting solution;
   treating the neutralized solution with an alkali metal salt solution having a density greater than the density of NaCl to effect agglomeration of the sodium chloride produced as a by-product of said reaction; and
   separating the agglomerated sodium chloride from the remaining materials present.

2. The process of claim 1 which includes in addition the step of recovering the resulting alcohol or phenol produced.

3. The process of claim 1 wherein the alkali metal salt is selected from the group consisting of alkali metal salts with a density in the crystalline state greater than the density of NaCl in the crystalline state.

4. The process of claim 1 wherein the alkali metal salt is an alkali metal bromide.

5. The process of claim 4 wherein the alkali metal salt is NaBr.

6. The process of claim 1 wherein the alkali metal salt is a carbonate or bicarbonate.

7. The process of claim 2 wherein the alcohol or phenol is recovered by solvent stripping.

8. The process of claim 1 wherein the NaCl is separated by centrifuging.

9. The process of claim 1 wherein the NaCl is separated by filtration.

10. The process of claim 1 wherein the reaction is performed in a common solvent for the dichlorophosphazene and the alkoxide and aryloxide.

* * * * *